United States Patent [19]

Hart

[11] Patent Number: 5,046,691
[45] Date of Patent: Sep. 10, 1991

[54] ORU LATCH

[75] Inventor: Raymond J. Hart, Villa Park, Calif.

[73] Assignee: TRW Inc., Redondo Beach, Calif.

[21] Appl. No.: 402,299

[22] Filed: Sep. 5, 1989

[51] Int. Cl.⁵ .......................... B64G 1/22; B64G 1/64
[52] U.S. Cl. .................................. 244/158 R; 244/161
[58] Field of Search .......................... 244/158 R, 161;
292/251, 201, 199; 411/378, 383, 432; 403/19,
20, 408.1; 81/57.36, 57.22; 439/310, 311, 361;
141/382–388; 901/30, 31, 39, 41, 47, 50

[56] References Cited

U.S. PATENT DOCUMENTS

| | | | |
|---|---|---|---|
| 3,411,041 | 11/1968 | Block | 317/100 |
| 3,888,362 | 6/1975 | Fletcher | 214/1 |
| 4,119,051 | 10/1978 | Orndorff, Jr. | 244/161 X |
| 4,286,834 | 9/1981 | Goodman | 339/16 |
| 4,298,178 | 11/1981 | Hujsak | 244/158 |
| 4,453,085 | 6/1984 | Pryor | 250/203 |
| 4,507,707 | 3/1985 | Willis | 361/380 |
| 4,607,815 | 8/1986 | Turci et al. | 244/161 |
| 4,771,971 | 9/1988 | Ludwig et al. | 244/161 X |

FOREIGN PATENT DOCUMENTS

| | | | |
|---|---|---|---|
| 238840 | 9/1987 | European Pat. Off. | 244/158 R |
| 3816502 | 12/1988 | Fed. Rep. of Germany | 244/158 R |
| 226497 | 9/1989 | Japan | 244/161 |
| 282098 | 11/1989 | Japan | 244/161 |
| 2182295 | 5/1987 | United Kingdom | 244/158 R |

Primary Examiner—Johnny D. Cherry
Assistant Examiner—James M. Kannofsky
Attorney, Agent, or Firm—Ronald M. Goldman

[57] ABSTRACT

An orbital replaceable unit, "ORU", is releasably attached to an orbital maneuverable vehicle, "OMV", by a one step fastening device. The ORU contains one part of the fastening device and the OMV the other. A drive tool, containing a motor and a driven shaft, is used to grip and carry the ORU into position with the OMV and then to actuate the one fastener portion carried by the ORU for fastening engagement with the remaining portion carried by the OMV, whereupon the drive tool may be removed.

30 Claims, 2 Drawing Sheets

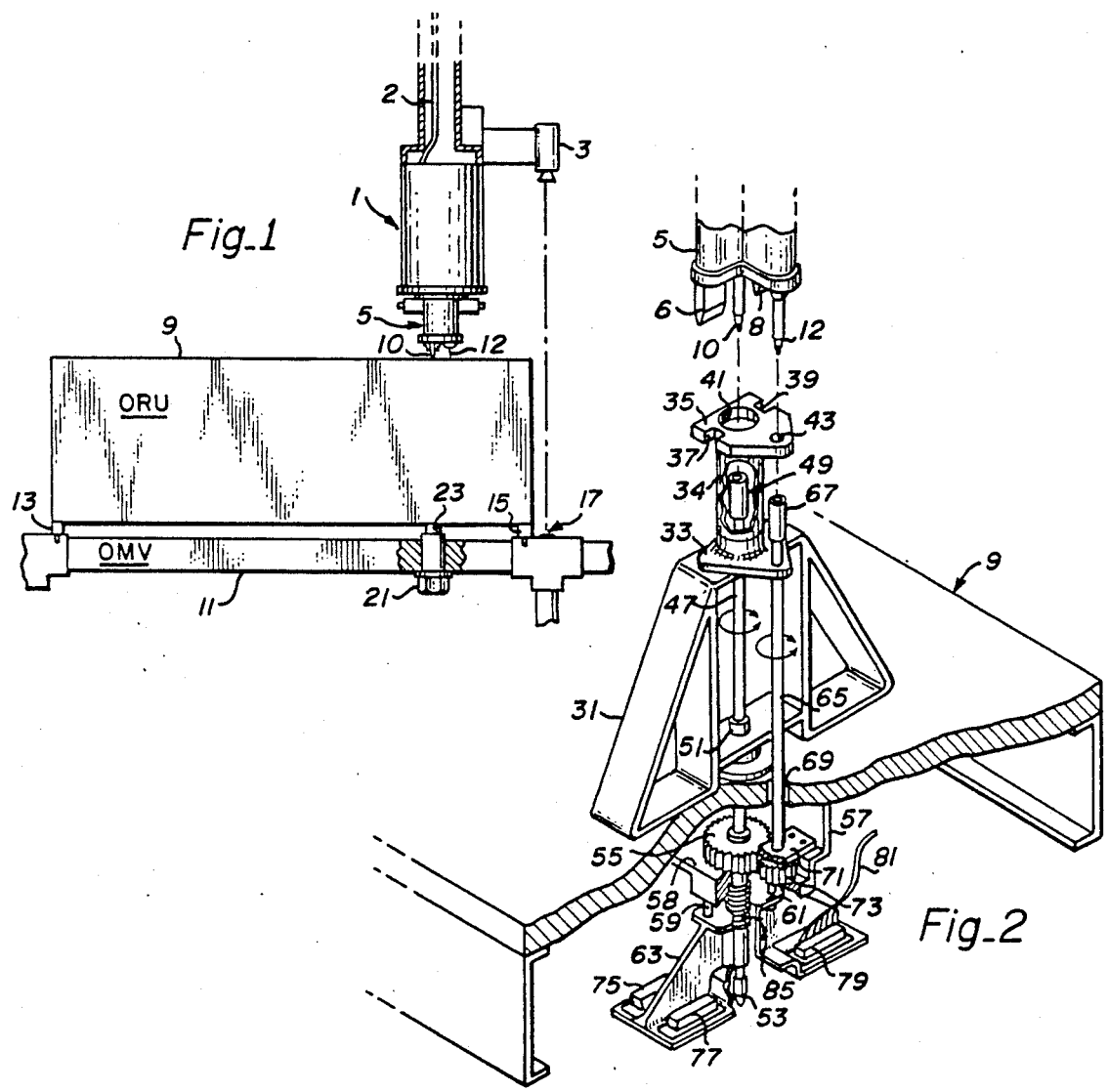
Fig. 1
Fig. 2
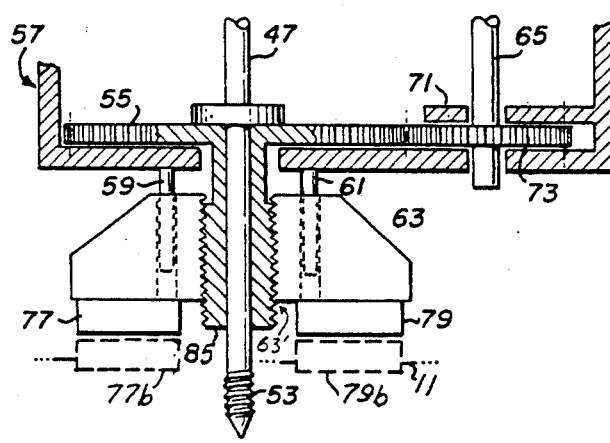
Fig. 3
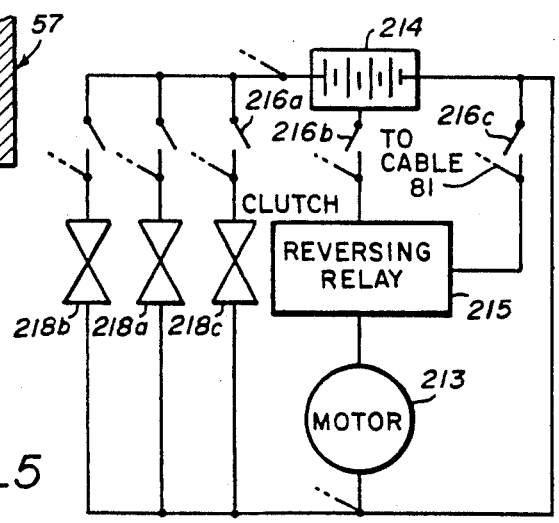
Fig. 5

ORU LATCH

FIELD OF THE INVENTION

This invention relates to a one step latch system and, more particularly, to a latching system for alternatively permitting manual or remote latching and unlatching of supply canisters or other equipment, referred to as an orbital replaceable unit, to another vehicle, such as an orbiting maneuverable vehicle.

BACKGROUND

The orbiting maneuverable vehicle or OMV, as variously termed, is a small size spacecraft that is intended to be placed into an outer space orbit and there allowed to remain for prolonged periods. Such spacecraft may be occupied from time to time by astronauts or may be remotely piloted from an earth based control station. With its on-board propulsion system, the OMV is adapted to move around and may be switched to different orbits, serving a support function to other space activities and satellites. Much like any other vehicle, the OMV requires consumable supplies, such as fuels and electrical energy, that are expended over time and must be replenished. Such supplies are furnished in a container or canister, referred to as an orbital replacement unit or ORU, that is fastened in place on the OMV. For example, a frequently used liquid is hydrazine; that liquid is supplied in a canister in the ORU and is connected by a fluid coupling into the plumbing in the OMV. Another example is electrical energy stored in electrical cells on an ORU. The electrical energy is coupled by an electrical connector into the wiring at the OMV. When the supply is depleted, the empty canister is removed and a new canister fixed in its place. In this way depletable resources, consumed in the operation of the spacecraft, may be replenished.

One possible technique for attaching the ORU to the OMV is to use conventional fastening systems, allowing an astronaut to remove the expended canisters and replace them with new ones. Simply put, another vehicle, such as the now familiar space shuttle, navigates to position and drops off the supplies. The astronaut goes to work; unbolting one canister and replacing another to the OMV. Though simple in theory in the same sense as unscrewing a light bulb from its socket and screwing in a fresh bulb, in practice in outer space application, it is both difficult and dangerous.

With conventional fastener systems, the astronaut is called upon to work at a number of locations; releasing one fastener at one location and another fastener at another location; detaching the electrical and fluid couplings; moving the expended canister and its associated couplings out of engagement; and, while holding onto the old canister so that it does not drift away, orienting the new canister into proper position and repeating the fastening process. In the gravity free space environment, unattached objects, being weightless, tend to drift about and, therefore, must be restrained by the astronaut. An extra pair of hands would be of obvious benefit in this situation. With and working against the physical constraints caused by the pressurized space suit, the astronauts activity is difficult work and very time consuming. By limiting the physical movement required of the astronauts in the described task, an obvious benefit is achieved.

An alternative to having the astronaut personally perform the ORU installation is to do so remotely, using a robotic manipulator assisted with a television camera for "eyes". However, the use of a manipulator to remotely position an ORU into place, fasten the ORU and ensure that electrical and fluid couplings are made between the ORU and OMV through observing the action through a television screen is also no small task if the number of steps to perform is numerous. As those who have used manipulator arms in carnival machines in an attempt to retrieve a prize know, the activity often strains ones patience. The fewer the number of different positions to which one must position the manipulator in the task of replacing an ORU, the faster the task may be accomplished and the less is the wear and tear to the operator's wits.

Further when the ORU is intended to supply electrical current to the OMV, the coupling includes an electrical connector with multiple contacts. Such connectors contain a large number of projecting pin like contacts oriented in parallel, which are to engage corresponding female contacts, sockets, in a corresponding connector of the OMV. If any of those connector pins are bent during the assembly process as could occur by misalignment of the ORU and OMV during assembly, the ORU is effectively rendered inoperative. Special care is necessary to ensure that none of the pins are bent or broken.

Although saving of work and time is particularly advantageous in outer space application, it is anticipated that other applications also exist for a fastener system that provides a one step assembly and/or disassembly process, and can benefit from like savings, even though such application is in a less hostile environment than the outer space environment. The present invention provides a one step latch system as well as an improved OMV and ORU combination that contains such a one step latch.

An object of the present invention, therefore, is to simplify and ease the task of installation and removal of ORU units from an OMV. A further object of the invention is to provide a one step latching mechanism that permits installation and fastening of an ORU to another object, including proper connection of fluid and/or electrical connections, with a single fastener with simple motions. A still additional object of the invention is to reduce the mechanical manipulation required to install or replace an ORU upon an OMV either directly or by remotely controlled manipulators.

SUMMARY OF THE INVENTION

The foregoing objects are achieved by an orbital replaceable unit, the ORU, that is releasably attached to an orbital maneuverable vehicle, the OMV, by an essentially one step fastening device. The ORU contains one part of the fastening device and the OMV the other. A drive tool, containing a motor and a driven shaft, is used to grip, carry and locate the ORU into position on the OMV and then actuate the one fastener portion carried by the ORU for fastening engagement with the mating fastener portion carried by the OMV, whereupon the drive tool may be removed. The drive tool may be a hand carried unit or be attached as a part of a remote-controlled manipulator arm.

In one embodiment the ORU is to supply a fluid and contains a fluid coupling that is to mate with a corresponding coupling on the OMV and in a second embodiment the ORU is to supply electrical current and contains an electrical connector that is to mate with a corresponding connector on the OMV. With each the drive tool also connects the fluid and/or electrical couplings between the ORU and OMV so that there is no wasted physical motion by the operator who is assembling the two units either in person or through a remote manipulator.

In more specific aspects the orbiting maneuverable vehicle includes a nut for receiving and therein fastening a bolt. The orbitable replaceable unit to be attached to the OMV includes a rotatable shaft with a drive socket at its one end and a bolt is coupled for rotation by that shaft.

Further the drive tool is motorized and includes a socket drive and a gripper. In its operation the drive tool's socket drive engages the ORU drive socket and, responsive to operation of the motor, turns the ORU drive socket and thereby turns said ORU shaft to screw the bolt into the nut, whereby said ORU is fastened to said OMV. During that operation the gripper holds the ORU and prevents the ORU from rotating. In the preferred form of the invention the fluid and/or electrical connections of the two units are coupled without moving the drive tool to a different position; and thereby completes the fastening of the ORU to the OMV. Once the ORU is fastened in place, further operation of the drive tool connects the electrical connectors or the fluid connectors of the ORU, depending upon the embodiment, with corresponding mating connectors in the OMV.

In a still further aspect of one embodiment the OMV's fluid coupling is located within the center of the nut, which is hollow, while the ORU's mating coupling is located within the bolt, which is also hollow.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS

In the Drawings:

FIG. 1 illustrates a preferred embodiment of the latching system employed in an orbital replaceable unit and orbital maneuverable vehicle combination;

FIG. 2 is a partial section perspective view which shows the elements of the latch and the electrical connector carried by the ORU in the embodiment of FIG. 1;

FIG. 3 illustrates to an enlarged scale the electrical connector assembly shown in FIG. 2;

FIG. 5 is a schematic illustration of the circuitry for the drive tool of FIG. 4.

DETAILED DESCRIPTION OF A PREFERRED EMBODIMENT

Figure 4:
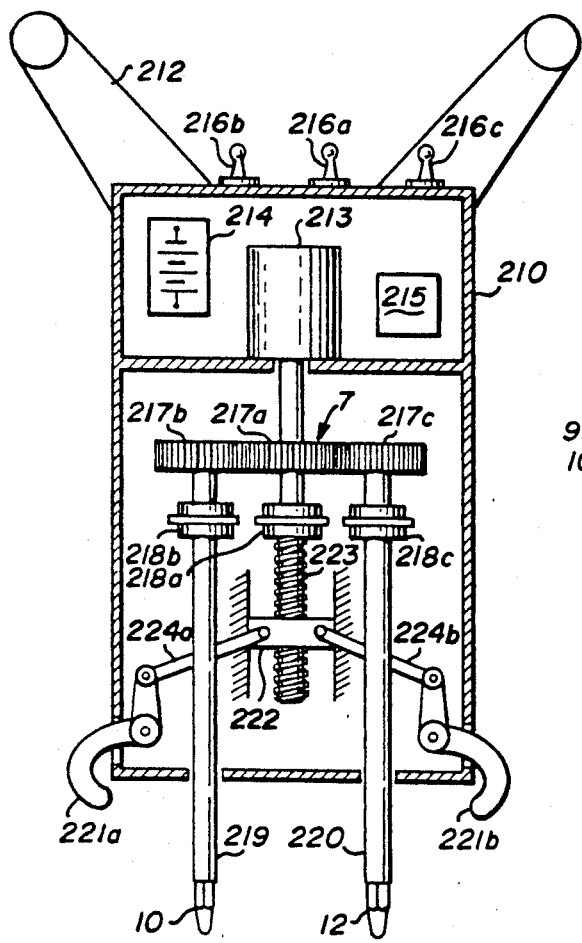
FIG. 4 illustrates a drive tool used with the embodiment of FIG. 2.

Reference is made to FIG. 1 which pictorially illustrates the relationship of the elements of a first embodiment of the system in place on assembly. This includes a robotic manipulator 1, partially illustrated, of conventional structure as is supported by a space shuttle vehicle, not illustrated, and is remotely controlled. The manipulator supports a television or video camera 3 and the manipulator arm supports or holds a drive tool 5, the latter of which is shown in position in engagement with an ORU, orbital replaceable unit 9. An electrical cable extends along the manipulator for connection to appropriate circuits in the drive tool, the cable being partially illustrated and denominated by the number 2. In this embodiment the ORU contains electrical cells that are intended to supply electrical current to circuits within the OMV. Accordingly, in addition to the mechanical fastening action between the two units, the ORU contains an electrical connector, not illustrated in this figure, that is to be connected to a mating connector on the OMV. As is appreciated other details of an ORU and OMV are not necessary to an understanding of the invention and, to avoid unnecessary complexity, are not further illustrated or described.

Drive tool 5 contains projecting drive shafts, 10 and 12, shown engaging appropriate mechanisms, hereafter more fully described, accessible from one wall of the ORU 9. The ORU is seated in place on the OMV 11, the latter of which is only partially illustrated to show the relevant connections. A pair of index pins 13 and 15 on the ORU extends outwardly and engages corresponding index pinholes in the OMV. An alignment target 17, which may be of any conventional structure or design, is attached to the OMV and serves as a visual aid for aligning by remote control the ORU in preparation for insertion of coupling 23 that extends from the bottom wall of ORU 9 into the mating coupling connector 21 on the OMV. Certain brackets are omitted in this pictorial view that are described elsewhere herein in connection with the other figures.

As shown in the partial perspective view of FIG. 2, a somewhat trapezoid shaped metal bracket 31, is fastened by welding or the like to a wall of ORU 9, partially illustrated. The bracket supports an additional bracket 33, and a hollow cylinder 34, containing a cylindrical passage. A plate 35, which as hereafter becomes more apparent serves as a grip, is fixed at the top of cylinder 34. The plate contains slots 37 and 39 located along a common axis on opposite sides of a circular opening 41 in the plate and to the underlying passage in cylindrical bracket 34. A second cylindrical passage 43 extends through plate 35.

An elongated drive shaft 47 extends through an opening, not illustrated, in the top of bracket 31, bracket 33, and into a passage within cylinder 34. The drive shaft terminates in an end drive socket 49. The end socket includes an opening into which a socket drive shaft 10 is to be inserted, the latter of which is part of the drive tool earlier described. At its other lower end, shaft 47 extends through a bearing 51. Further shaft 47 extends through an opening in the wall of ORU 9 and into the underside portion terminating in an enlarged cylindrical portion and a bolt end 53, illustrated at the bottommost part of the figure. At bolt end 53 there is included additional structure with which to permit bolt fastening, which is described later.

Gear 55 is loosely coupled to or, as otherwise stated, is rotatably mounted on shaft 47, but is not coupled for rotation with that shaft. A second bracket 57, depending from the underside of the ORU wall, contains a floor or bottom surface 58, partially cut away in the figure, against which the bottom side of gear 55 rests. This bracket serves to prevent gear 55 from sliding downward further along shaft 47 and maintains the gear in driven engagement with an adjacent driving gear 73. Bracket 57 also provides depending guide pins 59 and 61 for guiding a traveler bracket 63.

A second elongated shaft 65 extends through a bearing opening passage in bracket 33, shown at the upper part of the figure, spaced parallel from shaft 47, earlier described. The shaft supports a drive socket 67 at its upper end. Passage 43 is coaxial with the socket 67 and shaft 65, which are shown in a position underlying that opening. On the lower end shaft 65 also extends through an opening 69 in the ORU wall, which opening is shown partially cut away, and is supported for rotation in a bearing bracket 71, the latter of which is attached to bracket 57. Bracket 71 serves as a journal bearing for shaft 65. A gear 73 is attached at the bottom end of shaft 65 for rotation with that shaft. As shown, gear 73 is in mating driving engagement with gear 55, previously described, whereby rotation of shaft 65 rotates gear 55.

Traveler bracket 63 carries four electrical connectors, 75, 77, 79, only three of which are illustrated, with the fourth connector being symmetrically diagonally located on the upper right corner of the bracket, which is obstructed in this view. The traveler has a bottom wall with surface portions oriented orthogonal to the axis of the bolt 53. The electrical connectors are of conventional structure and are attached to those surface portions with the contacts or receptacles facing outwardly. The traveler is shown in the figure partially cut away in order to permit a view of the bolt 53 and its parts.

The partial section view of FIG. 3 presents an additional view of the traveler 63, the screw 85, gears 55 and 73 and shafts 47 and 65 as may assist the readers understanding. Traveler 63 contains a threaded central passage, generally indicated at 63', in which screw 85 is shown disposed. Thus shaft 65 drives gear 73 and gear 55, driven thereby turns screw 85 and forces traveler 63 to move along the axis of shaft 47 and move electrical connectors 77 and 79. The mating portions to connectors 77 and 79, carried by the OMV, are shown symbolically as 77b and 79b, respectively, illustrated by dash lines.

Returning to FIG. 2, each of the electrical connectors carried by traveler 63 includes electrical cabling that extends from the rear or terminal side of the connector, the surface exposed to view in the figure, to appropriate electronic equipment, not illustrated, in the ORU. Only one of such cables 81 is symbolically illustrated in order to better present the embodiment.

Gear 55 is connected to and drives a hollow cylindrical screw 85, the latter of which is mounted coaxial with and on shaft 47. This is better illustrated in FIG. 3 to which reference is again made. Screw 85 engages a mating thread in the traveler bracket 63. Pins 59 and 61, fixed to and depending from bracket 57, are slidably received within corresponding cylindrical passages through the top horizontal portion of traveler 63, which arrangement serves as a guide for the traveler. By rotating shaft 65, bracket 63 may be moved up or down along the axis of bolt 53 by the screw, depending on the direction of shaft rotation.

The structure of the drive tool used in conjunction with the foregoing structure is next considered. The drive tool used in connection with the embodiment of FIG. 2 is illustrated in greater detail in FIG. 4. This element includes a casing 210, a pair of attached handles 212, which are preferably removable permitting the tools to be coupled to the manipulator, a reversible electric DC motor 213, a battery 214, a reversing relay 215, manually operable toggle type electrical switches including a three or four position electrical control switch 216a, electrical power switch 216b and a reversing switch 216c, a gear train 7, consisting of a driving gear 217a in the center, which is coupled to the motor 213 by a shaft, and two driven gears 217b and 217c, and three clutches 218a, 218b and 218c.

A first drive shaft 219 is coupled to clutch 218b and a second drive shaft 220 is coupled to clutch 218c. Shafts 219 and 220 terminate in hexagonal shaped ends 10 and 12, respectively, the latter of which were earlier described. Fingers 221a and 221b are pivotally mounted within the casing and are linked to a traveler 222 and gear screw 223 through respective links 224a and 224b. An electrical schematic diagram is presented in FIG. 5 in which the elements described in FIG. 4 are identified with the same numeral, though illustrated in schematic form. As shown by the dotted lines, electrical circuits are extended via the cable earlier mentioned to a control panel in the shuttle via the manipulator arm. That control panel contains switches that are effectively connected in parallel electric circuit with those electrical switches illustrated in FIGS. 4 and 5 so as to permit the electrical circuits to be opened or closed in the same manner as when an astronaut personally operates the switches located on the drive tool. The circuit is otherwise essentially self explanatory.

The operation may be considered initially in FIG. 1 in connection with a remote manipulator. Briefly, an operator in one spacecraft, the supply vehicle, controls the manipulator holding the drive tool, inserts the tool into the ORU and operates a gripping device in the tool, illustrated in other figures, to grip, pick up and carry the ORU from its stowed position in the supply vehicle to a position adjacent the OMV for installation.

Reference is again made to FIG. 2. In operation tool 5 is lowered by the manipulator from its position illustrated in FIG. 2 into engagement with the brackets so that the gripping fingers 6 and 8 enter the corresponding slots 37 and 39 in bracket plate 35. Shaft 10 and shaft 12 enter the corresponding spaced passages 41 and 43 with the tip ends entering sockets 49 and 67, respectively, associated with shaft 47 and 65 respectively, to form a mating engagement. Through operation of circuits in the drive tool, the fingers 6 and 8 are moved toward one another to compressively clamp or grip bracket 35 and thereby firmly grip the ORU. As one appreciates in the weightlessness of space, the clamping engagement of the fingers within the slots is sufficient to grip and hold the ORU and to move the essentially weightless ORU by manipulating the position of tool 5.

Observing the output of the television camera at his video monitor, not illustrated, the operator observes target 17 as presented in FIG. 1, orients the ORU both axially and rotationally relative to the target and moves the ORU forward into position in which the ORU's index pins 13 and 15 engage the corresponding pinholes in the OMV. The operation of drive tool 5 to fasten the couplings, bolt 23 and nut 21, together to hold the ORU in place on the OMV is described in greater detail hereafter in this specification and becomes more apparent from consideration of the detailed structure of the latch and associated fluid and electrical connections hereafter presented. After installation of the ORU, the drive tool releases its grip on the ORU and the tool thereafter is withdrawn by the manipulator.

It is noted that the described operation occurs in reverse order for ORU removal; that is, with an ORU in place on the OMV, the operator manipulates the arm and inserts the drive tool into its position and then operates the gripping mechanism to grip the ORU. The drive tool is operated in reverse and unfastens the ORU from the OMV. With the ORU supported and held by drive tool 5, the ORU is then carried by the manipulator into the supply space vehicle for storage.

Through remote arm manipulation of the drive tool or alternatively, by hand operation, the ORU is positioned against the OMV with bolt 53 oriented coaxial with the mating threaded nut, illustrated in figure 1 generally as connector 21, and with the ORU properly aligned with the pins 13 and 15 also illustrated in figure 1 properly engaged in the receiving pin holes in the OMV. Electrical current is supplied to the motor 213 carried in the drive tool and the drive tool motor is energized and first rotates shaft 10, a driving shaft. Shaft 47, coupled in a driven relationship with shaft 10, rotates accordingly, causing bolt 53 to screw into place with a mating thread on the nut connector in the OMV, not illustrated in the FIG. 2. Shaft 47 turns until the bolt is tightly fitted into the OMV coupling, increasing the torque on the shaft. In so doing the bolt pulls the entire ORU tightly against the OMV.

When a predetermined level of torque is attained as described, a clutch mechanism 218a in tool 5 disengages shaft 10 and engages the next shaft 12 causing the second shaft to rotate and drive shaft 65. Shaft 65 rotates a turning gear 73, located at the lower portion of the figure, and gear 73 in turn drives gear 55. Gear 55 in turn rotates the ensleeving screw 85. In turn, the thread on 85 drives the traveler bracket 63, moving the bracket toward the OMV. After a predetermined amount of travel, the electrical connectors 75, 77 and 79 and including the fourth electrical connector, not illustrated, are moved into mating engagement with corresponding electrical connectors, only two of which are illustrated in FIG. 3, in the OMV, completing electrical connections therebetween. As this connection is made, the torque exerted on shaft 65 increases. When the torque increases to a predetermined level, the clutch 218b disengages the motor from tool drive shaft 12.

To detach the ORU a reverse order is used. That is, tool 5 is lowered into place and grips the bracket and shaft 12 is driven in the reverse direction, counterclockwise in the example, resulting in the withdrawal or backing away of bracket 63 and the electrical connectors carried thereby from the corresponding mating engagement with the OMV electrical connectors. As the torque increases in this direction, such as when the upper end of the bracket abuts the bracket 58, a position of total withdrawal, the engaging clutch in the drive tool disengages shaft 12 and connects shaft 10 to the motor. The motor rotates this shaft in the opposite direction, counterclockwise in the example, to unscrew the bolt 53 from the nut in the ORU. The ORU may then be moved to a storage location by simply moving the drive tool.

The drive tool's fingers 6 and 8 grip and hold the ORU by end plate 35. It is noted that the fingers also serve to couple torque applied through either of the shafts to plate 35. This insures that the respective shafts are rotated and not the driving tool as those skilled in the mechanical arts and who are familiar with the weightlessness of space appreciate. For space application the preferred form for the tool is to both grip the ORU and perform the bolting and unbolting operations.

Hand operation of the drive tool is essentially the same as operation earlier described when the drive tool is carried on the manipulator and is remotely operated. Thus after the power switch 216a is operated the operator selects position one so that current is applied to the motor, which rotates the screw and moves the drive tool traveler 222 downwardly causing the links 224a and 224b to pivot the fingers 221a and 221b, the first counterclockwise and the second clockwise to grip the underlying plate as described; and upon such engagement clutch 218a disengages the screw. The second switch 216b is then toggled and the drive shaft 219 rotates to drive the bolt shaft in the ORU carried portion as was earlier described, and clutch 218b disengages the shaft as soon as the torque reaches a predetermined level. The toggle switch is moved to the third position, motor 213 is again energized and the shaft 220 is rotated with the clutch 218c disengaging same when the torque builds up. The operator may then shut off the main power switch and withdraw the drive tool.

It is understood that the battery and toggle switches may be eliminated if the tool is to be dedicated to use by the manipulator. In that, even the dc power for the motor and relays and the circuit closing switches may be located on the manipulator base and supplied by a cable to the tool.

The foregoing described an embodiment in which the ORU contained electrical cells and serves as a source of electrical current to circuits within the OMV. Power can also be coupled from the OMV to the ORU; in a typical application it is expected that electrical power can pass in both directions. An alternative embodiment illustrates the construction in which the ORU contains a fluid, such as hydrazine, that is to be delivered to the OMV, which is partially illustrated in FIG. 6 to which reference is made.

Figure 6:
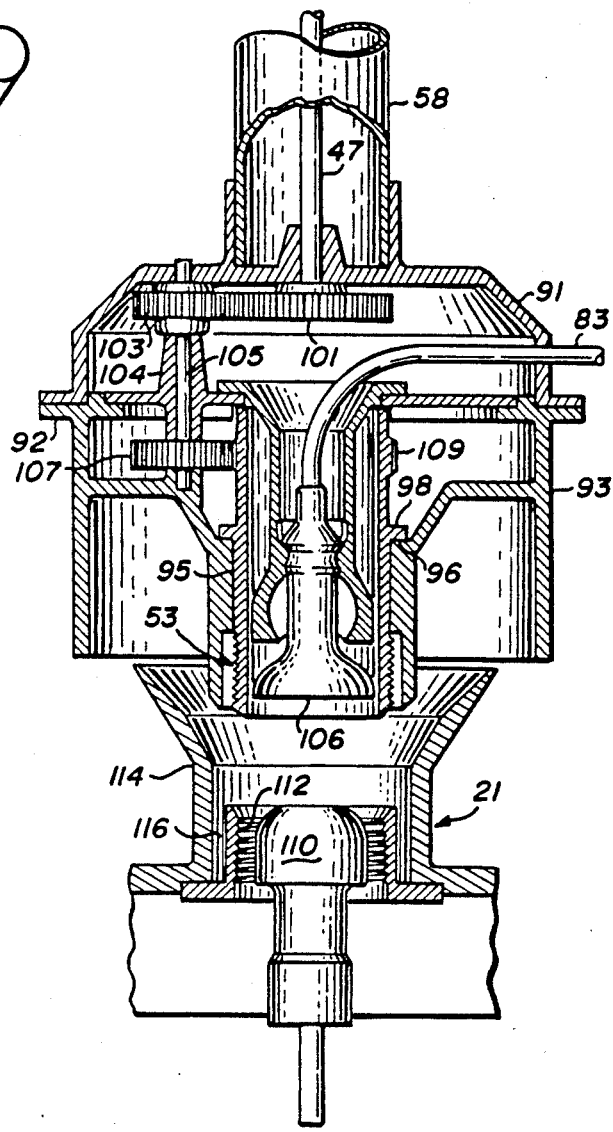
FIG. 6 illustrates in section view and to an enlarged scale the center section of a second embodiment of the latching system that contains provision for attaching a fluid connector.

In FIG. 6 an enlarged section view is presented of the coupling carried by the ORU and the mating coupling carried by the OMV. In as much as much of the remaining structure used in this embodiment involves the same elements presented in connection with the embodiment of FIGS. 1 through 5, that common structure is not again illustrated or described in detail. However, for convenience elements in this embodiment that are like the elements of the prior embodiment are identified by the same number primed.

Some differences are noted, though they do not require illustration. The drive tool used in this alternative embodiment may be the same as the drive tool presented in FIG. 4, but with the second driving shaft 12 omitted. More preferably, the drive tool used in conjunction with this embodiment contains only the single driving shaft 10 and associated circuits.

Additionally, the ORU bracket 31 presented in FIG. 2 does not require in this embodiment the second hole 43, shaft 63 and associated elements, which are thus omitted. Accordingly, the bracket arrangement for the ORU in this embodiment is of a more simple structure.

As a point of reference, drive shaft 47' earlier discussed in FIG. 2 is shown in the upper side of the figure. The shaft is surrounded by a cylindrical sleeve 58. The lowermost bolt end, generally represented as 53' in the figure, is depicted in section view at the lower end of the figure. A housing assembly is formed of two cylindrical parts, 91 and 93, that are fastened together along an outwardly extending flange 92. The cylindrical parts define a cavity, and include internally bearing surfaces and support brackets. A hollow bolt member 95 of generally cylindrical shape, contains a thread 53' located on the outer surface proximate one end to define a bolt. The bolt member is seated within the cavity by an outwardly projecting ring like rim portion 98 that is seated atop a bearing surface 96 formed by an internal cylindrical portion of housing 93. A cylindrical passage within the housing member includes an end portion 99 that serves as a guide and protects adjacent screw threads 53'. The guide provides clearance between the threaded outer wall of the bolt and the inner wall of the sleeve. The mating nut portion 112, shown below on the OMV, fits within the clearance.

Shaft 47' extends through a bearing passage in upper housing portion 91 and is attached to a gear 101, rotatably driven thereby. Gear 101 in turn is coupled to and drives a second gear 103 attached to another shaft 105, offset from shaft 47'. The ends of the offset shaft 105 are supported for rotational movement by bearing surfaces in the upper and lower housing portions as shown. A guide 104 containing a cylindrical passage is supported in the housing and supports an intermediate portion of shaft 105. Shaft 105 is connected to and drives an additional gear 107. In turn gear 107 engages and drives a gear 109 that is formed on the outer surface of bolt sleeve 95. In effect the assembly of elements 103, 105 and 107 provides an offset from the axis of shaft 47 so that the rotational movement may be applied to bolt 95 from a location off the axis of shaft 47'. This leaves clearance between the upper end of bolt member 95 and the end of shaft 47. This allows space for the introduction of fluid line 83. The fluid line 83 and the fluid connector 106 are fitted within the hollow of the bolt coaxial with shaft 47.

The OMV spacecraft includes fluid connector 110 shown on the lower portion of the figure adapted for mating engagement with the female fluid connector 106; hollow nut 112, containing an internal bolt thread; and an outer guide wall 114 having an inverted frusto conical shape flared end surround the hollow nut. A clearance space 116 is provided between the outer wall of the nut and the inner wall of the guide within which to receive the depending end cylinder 99 of the mating ORU connector.

Fluid connector 110 has a convexly shaped or rounded outer surface while the mating connector 106 on the ORU contains a concavely shaped or rounded surface. The complementary rounded shape allows a fluid coupling, notwithstanding any slight axial misalignment between the two elements, but also allows the connector to be self aligning. That is, in threading the bolt into place in the nut, any slight misalignment between the male and female fluid connectors straightens out; the smooth surfaces of the connector parts being permitted to pivot relative to one another. Fluid valves 110 in the OMV and 106 in the ORU are of the automatic shut off type, one of the known varieties of connector systems in which upon decoupling with a mating connector from a fluid source an opening is detected and the valve shuts off immediately to prevent escape of any fluid in the plumbing, not illustrated, behind coupling 110 and coupling 106. O-ring seals, not illustrated, which are conventional, are suitably incorporated in the fluid coupling, and on coupling 110 to assure that the connection does not leak.

Neither fluid coupling 106 and fluid line 83 are permitted to rotate. With the off-set drive arrangement, the force that holds the two halves of the fluid connectors together is applied along the connector axis to prevent cocking between the two halves, while allowing for the presence of the fluid line on the center axis of the coupling.

Preferably the threads on bolt 97 and nut 112 are of the standard Acme type. All of the elements of the connectors and the fastener elements described to the present are suitably formed of metal. However, in other applications that are less critical than space based applications engineering plastics may be substituted as materials for some of the parts.

Reference may be made to the preceding description of operation in picking up, carrying and orienting the ORU given in connection with the description of the prior embodiment. Due to the preliminary orientation between the ORU and the OMV, the end of bolt 53' is lowered from the position illustrated in FIG. 6 to a position in contact with the hollow of and at the upper end of nut 112. The drive tool shaft 10 couples to and rotates shaft 47'. Rotation of shaft 47' rotates shaft 105 through gears 101 and 103. Shaft 105 in turn rotates bolt 53' rotating bolt member 95 through gears 107 and 109. Rotation of bolt member 95 screws the bolt threads 53' into nut 112 carried by the OMV. As shaft 47' continues to rotate, the bolt threads into the nut and pulls the ORU assembly to which the bolt is attached and, accordingly, the entire ORU is moved toward the OMV. Consequently the liquid coupling 106 is firmly pressed against the mating coupling 110 to complete the fuel line connection between the ORU and OMV. As bolt 53' is in this way tightened, the torque on shaft 47' increases, eventually attaining the predetermined torque level that results in removal of the drive to the shaft as earlier described in connection with the drive tool.

Effectively by means of a single drive tool the astronaut may detach and carry an ORU from its position on the OMV to a position in storage. Likewise the astronaut may carry, install and fasten an ORU in a one step type of operation. The mechanical effort required of the astronaut is thus reduced to a minimum. Likewise with the same tool and a different "hand" attachment, whereby the tool is fitted to a robotic manipulator, ORU's may be easily installed or removed from service and stored by remote control in a procedure requiring minimum mechanical movement. A single robotic manipulator is all that is required. The frustration normally accruing in assembly operations by remote control type operators involving many mechanical operations, is entirely avoided.

It is believed that the foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. Apparatus for releasibly fastening a first object to a second object with the intervention of a driving tool means, said first object having opposed first and second sides, comprising in combination:

driven fastener means carried by said first object ad being located on said first side of said first object;

drive input means carried by said first object for driving said fastener means, said drive input means being located on said second side of said first object, said drive input means being adapted to receive a driving tool and including an elongate shaft;

said driven fastener means being responsive to operation of said drive input means for fastening said first object to said second object; and said driving tool means for releasibly coupling to and applying force to said drive input means, to thereby operate said driven fastener means, said driving tool means being separate from and independently moveable relative to each of said first and second objects to a location remote therefrom and being moveable into coupling engagement with said drive input means; and said driving tool means includes a gripper; and wherein said first object includes a grip, with said gripper being adapted to grip said grip.

2. The invention as defined in claim 1 wherein said gripper comprises:

tool drive shaft means, including a screw means;

drive tool traveler means coupled to said screw means in driven relationship therewith, whereby said traveler means moves responsive to rotation of said tool drive shaft means;

first and second fingers, with each of said fingers being pivotally mounted for pivotal movement with one said fingers being pivotable in one direction and the other of said fingers being pivotable in a second direction opposite to said first direction; and link means coupling said fingers to said drive tool traveler means for pivoting said fingers responsive to movement of said traveler means.

3. The invention as defined in claim 1, wherein said second object includes fastener means adapted to mate with said driven fastener means of said first object.

4. The invention as defined in claim 1 wherein said driving tool means further comprises:

electric motor means;

control means for coupling said motor means to said gripper to cause said gripper to grip said grip and, alternately, for coupling said motor means to said drive input means to drive said drive input means.

5. The invention as defined in claim 1 wherein said driven fastener means includes:

bolt means; said bolt means being of hollow construction and having an open end; and fluid coupling means located within the hollow of said bolt means, said fluid coupling means facing said open end.

6. The invention as defined in claim 5, wherein said second object includes fastener means adapted to mate with said driven fastener means of said first object; said fastener means of said second object comprising a hollow unit; and fluid coupling means located in said hollow nut adapted to mate with said fluid coupling means of said first object.

7. The invention as defined in claim 1 wherein said drive input means further comprises:

first shaft means;

drive socket means;

said first shaft means being coupled to said driven fastener means and to said drive socket means for joint rotation therebetween.

8. The invention as defined in claim 7 wherein said drive input means comprises further:

bolt means attached to an end of said first shaft means and adapted to be driven by said first shaft means;

second shaft means rotatably mounted and positioned axially displaced from said first shaft means;

first gear means coupled to said second shaft means for joint rotation therewith; second gear means coaxially rotatably mounted on said first shaft means with said second gear means being in driven relationship with said first gear means;

screw means; said screw means being oriented coaxial of said first shaft means and coupled for joint rotation with said second gear means.

9. The invention as defined in claim 8 wherein said driven fastener means includes:

electrical connector means;

traveler means carrying said electrical connector means;

said traveler means including a nut adapted to mate with and be driven by said screw means.

10. Apparatus for releasibly fastening a first object to a second object with the intervention of a driving tool means, said first object having opposed first and second sides, comprising in combination:

driven fastener means carried by said first object and being located on said first side of said first object;

drive input means carried by said first object for driving said fastener means, said drive input means being located on said second side of said first object and being adapted to receive a driving tool;

said drive input means further comprising:

first shaft means;

drive socket means;

said first shaft means being coupled to said driven fastener means and to said drive socket means for joint rotation therebetween;

said driven fastener means being responsive to operation of said drive input means for fastening said first object to said second object;

said first object further including:

second shaft means;

second drive socket means;

first gear means;

said second drive socket means and said first gear means being coupled to said second shaft means for joint rotation therewith;

second gear means; said second gear means being in driven relationship with said first gear means;

screw means; said screw means being coupled with said second gear means for joint rotation therewith;

traveler means; said traveler means being coupled to said screw means, whereby rotation of said screw moves said traveler means axially of said first shaft means;

electrical connector means;

said electrical connector means being carried by said traveler means, whereby said electrical connector means is moved along said first shaft means responsive to rotation of said second shaft means;

said driving tool means for releasibly coupling to and applying force to said drive input means, to thereby operate said driven fastener means.

11. The invention as defined in claim 10 further comprising a cylindrical sleeve; said sleeve being mounted over said first shaft means; and wherein said second gear means is coaxially mounted to said sleeve for joint rotation therewith and said screw means is attached coaxially to said sleeve at a position axially spaced from said second gear means for joint rotation therewith.

12. The invention as defined in claim 10 wherein said driving tool means further comprises:
electric motor means;
first and second tool drive shaft means;
said first and second tool drive shaft means being adapted to engage said first and second drive socket means, respectively;
control means for coupling said motor means to said first and second tool drive shaft means for alternately driving said first and second tool drive shaft means.

13. The invention as defined in claim 12 wherein said drive tool means further includes: handle means for permitting said tool to be manually gripped and manually operable switch means coupled to said control means for permitting selection of said first or second tool drive shaft means that is driven by said motor means.

14. The invention as defined in claim 12 wherein said drive tool means further comprises: a plurality of clutch means, with one of said clutch means being associated in operative relationship with a corresponding one of said tool drive shaft means; said clutch means being responsive to said associated tool drive shaft means attaining a predetermined torque for disengaging said respective tool drive shaft means from said motor means.

15. The combination comprising:
an orbital maneuverable vehicle, said orbital maneuverable vehicle including bolt receiving nut means having a threaded opening for receiving and therein fastening a bolt means;
an orbital replaceable unit for attachment to said orbital maneuverable vehicle, said orbital replaceable unit including:
a wall, with said wall containing an opening;
first shaft means;
mounting means for rotatably mounting said first shaft means;
drive socket means, said drive socket means being coupled to said first shaft means and said drive socket means being accessible from the exterior of said orbital replaceable unit;
bolt means;
said bolt means being coupled for rotation by said shaft means;
said bolt means extending through said opening in said wall for engagement with said nut means of said orbital maneuverable vehicle; and
grip means;
tool means; said tool means including;
motor means;
socket drive means;
gripper means;
means for coupling said motor means to said socket drive means for rotating said drive means responsive to supply of electrical power to said motor means;
said socket drive means being adapted to releasibly matingly engage said drive socket means and, responsive to operation of said motor means, for rotating said drive socket means and thereby said first shaft means of said orbital replaceable unit to drive said bolt means into said bolt receiving nut means of said orbital maneuverable vehicle, whereby said orbital replaceable unit is fastened to said orbital maneuverable vehicle;
said gripper means being adapted to engage said grip means on said orbital replaceable unit to prevent rotation of said orbital replaceable unit responsive to rotation of said shaft means, whereby counter torque is applied to said grip means, and to permit portage of said orbital replaceable unit between a place of storage and a position in fastened relationship with said orbital maneuverable vehicle and vice-versa and said tool means being disengagable form said grip means to permit said tool means to disengage said socket drive means from said drive socket means and be moved to a location remote from said orbital replaceable unit.

16. The invention as defined in claim 15 wherein said tool means includes torque responsive clutch means for disengaging rotation of said socket drive means responsive to attainment of a predetermined torque load on said shaft means, indicative of said orbital replaceable unit and orbital maneuverable vehicle being in a fastened relationship.

17. The invention as defined in claim 15 wherein said tool means further comprising:
power source means, power switch means, means for coupling said power switch means and said power source means in circuit for supplying power to said motor means responsive to operation of said switch means.

18. The invention as defined in claim 15 wherein said tool means includes an electric cell for supplying power; power switch means; said power switch means being coupled in circuit with said cell and said motor means for supplying power from said cell to said motor means responsive to operation of said switch means.

19. The invention as defined in claim 15 wherein said orbital replaceable unit further comprises a bracket; a bearing for said first shaft means; a second shaft means spaced from said first shaft means and supported for rotation in said bracket; first gear means on said first shaft means for rotation therewith and second gear means on said second shaft means for rotation therewith with said first and second gear means being in rotational engagement; third gear means on said second shaft means for rotation therewith and fourth gear means on said bolt means for rotation therewith, said third and fourth gear means being in mating engagement; and means for preventing lateral movement of said bolt means; whereby movement of said first shaft means results in movement of said second shaft and corresponding movement of said bolt means.

20. The invention as defined in claim 15 wherein said orbital replaceable unit grip means comprises plate means; said plate means containing edges for permitting gripping by said gripper means; means mounting said drive socket means in a position underlying said plate means; and said plate means having a central opening to define a passage permitting said tool means access to said drive socket means.

21. The invention as defined in claim 20 wherein said plate means includes a pair of slots located on opposite sides of said central opening, said slots extending through opposed edges of said plate means.

22. The invention as defined in claim 21 further including bracket means, said bracket means being attached to said orbital replaceable unit and supporting said plate means in spaced relationship to said orbital replaceable unit wall.

23. The invention as defined in claim 15 wherein said orbital maneuverable vehicle bolt receiving nut means comprises a hollow cylindrical member containing an internal thread and wherein said orbital replaceable unit bolt means comprises a hollow cylindrical member containing an outer thread;

first fluid coupling means located in said bolt receiving nut means;

second fluid coupling means located in said hollow cylindrical member of said bolt means;

said first and second fluid coupling means being adapted to matingly engage to provide a fluid passage between said orbital replaceable unit and said orbital maneuverable vehicle.

24. The invention as defined in claim 23 further including guide means surrounding said bolt receiving nut means, said guide means having a funnel shaped opening to guide said orbital replaceable unit bolt means into coaxial alignment with said bolt receiving nut means.

25. The invention as defined in claim 23 wherein said first fluid coupling means comprises an automatic shut off type fluid coupling means for preventing fluid passage therethrough responsive to disengagement of said first fluid coupling means from engagement with a mating fluid connector.

26. The invention as defined in claim 25 wherein said first fluid coupling means contains a convexly rounded tapered exterior surface and wherein said second coupling means contains a concavely rounded interior surface for permitting mating engagement between said first fluid coupling means for preventing said fluid coupling means from obstructing movement of said bolt means into coaxial relationship with said bolt receiving nut means.

27. The invention as defined in claim 15 further comprising:

first electrical connector means located on said orbital maneuverable vehicle; second electrical connector means being located on said orbital replaceable unit;

said electrical connectors being adapted for mating engagement;

and wherein said orbital replaceable unit further includes:

traveler means for movably mounting said second electrical connector means for coaxial movement toward or away from engaging relationship with said first electrical connector means;

second shaft means rotatably mounted in spaced relationship to said first shaft means, said second shaft means containing a drive socket means;

said traveler means being responsive to rotational movement of said second shaft means in one direction, clockwise or counterclockwise, for moving said second electrical connector means toward the mating second connector means on said orbital maneuverable vehicle for mating engagement therebetween and responsive to rotational movement of said second shaft means counterwise to said first direction for moving said electrical connector means away from said mating relationship with said first connector means; and wherein said tool means further comprises: a drive shaft, said drive shaft being coupled to said motor means for rotation by said motor means responsive to termination of rotation of said first shaft means; and clutch means responsive to said drive shaft attaining a predetermined torque level for disengaging said drive shaft from said motor means to terminate rotation of said drive shaft.

28. The invention as defined in claim 27 wherein said traveler means includes:

a central passage containing a thread;

said orbital replaceable unit further including:

first gear means located on and rotatable with respect to said first shaft means and second gear means located on said second shaft means with said first and second gear means being matingly engaged;

screw means coupled to said first gear means for joint rotation therewith; said screw means being coupled to said traveler threads; whereby rotation of said second shaft means rotates said first gear means and drives said traveler;

means for preventing lateral movement of said gear means along said driving axis.

29. The invention as defined in claim 15 wherein said orbital maneuverable vehicle further comprises: target means for providing a visual alignment indicium; and wherein said combination further includes: video camera means, said video camera means being mounted in fixed relationship to said tool means for permitting remote observations of said orbital maneuverable vehicle target means to ascertain alignment therebetween.

30. The invention as defined in claim 29 wherein said orbital replaceable unit includes further a pair of index pins, said pins being spaced from one another.

* * * * *